United States Patent
Kent et al.

(10) Patent No.: US 8,599,204 B2
(45) Date of Patent: Dec. 3, 2013

(54) CONTROLLING EDGE ROUTING USING LAYOUT CONSTRAINTS

(75) Inventors: Stuart Kent, Canterbury (GB); Fabian Winternitz, Sammamish, WA (US); Kael Rowan, Kenmore, WA (US); Timothy Dwyer, Seattle, WA (US); Lev B. Nachmanson, Redmond, WA (US); Edward Hart, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 12/949,828

(22) Filed: Nov. 19, 2010

(65) Prior Publication Data

US 2012/0127177 A1 May 24, 2012

(51) Int. Cl.
G06T 11/20 (2006.01)
G09G 5/00 (2006.01)
G06F 3/00 (2006.01)
G06F 3/048 (2013.01)

(52) U.S. Cl.
USPC ........... 345/440; 345/441; 345/443; 345/619; 715/712; 715/713; 715/763; 715/764; 715/788

(58) Field of Classification Search
USPC .......... 345/418, 440, 441, 443, 619; 715/517, 715/712, 713, 763, 764, 788, 853, 854
See application file for complete search history.

(56) References Cited

U.S. PATENT DOCUMENTS

| | | | |
|---|---|---|---|
| 5,337,404 A | | 8/1994 | Baudelaire et al. |
| 5,764,239 A | | 6/1998 | Misue et al. |
| 6,067,572 A | | 5/2000 | Jensen et al. |
| 7,418,683 B1 | * | 8/2008 | Sonnard et al. ............... 716/122 |
| 7,483,028 B2 | | 1/2009 | Wong et al. |
| 8,365,129 B2 | * | 1/2013 | Winternitz et al. ........... 716/126 |
| 2003/0101029 A1 | * | 5/2003 | Drumheller ....................... 703/1 |
| 2008/0301547 A1 | | 12/2008 | Karunakaran et al. |

OTHER PUBLICATIONS

Danny Holten, Jarke J. van Wijk, Force-Directed Edge Bundling for Graph Visualization, 2009, Eurographics/IEEE-VGTC Symposium on Visualization, 28(3):983-990.*

Doantam Phan, Ling Xiao, Ron Yeah, Pat Hanrahan, Terry Winograd, Flow Map Layout, 2005, Proceedings of the 2005 IEEE Symposium on Information Visualization, p. 219-224.*

L. Beth Protsko, Paul G. Sorenson, J. Paul Tremblay, Douglas A. Schaefer, Towards the Automatic Generation of Software Diagrams, 1991, IEEE Transactions on Software Engineering, 17(1):10-21.*

Tim Dwyer, Yehuda Koren, Kim Marriott, IPSEP-COLA: An Incremental Procedure for Separation Constraint Layout of Graphs, 2006, IEEE Transactions on Visualization and Computer Graphics, 12(5):821-828.*

(Continued)

*Primary Examiner* — Aaron M Richer
*Assistant Examiner* — Michael J Cobb

(57) ABSTRACT

A system and method for creating or editing a graph diagram. A system provides a mechanism to specify constraints on edge way points. Constraints may specify alignment with other way points, distribution of way points, spacing from other way points or nodes, or other types of constraints. A system may automatically determine edge way point constraints based on edge direction, edge type, target nodes or regions of nodes, or other characteristics of edges. The system enables a combination of constraints specified by a user and automatically determined by the system. Way points are positioned based on associated constraints, and edges are routed based on their associated way points.

20 Claims, 8 Drawing Sheets

(56) References Cited

OTHER PUBLICATIONS

Kathy Ryall, Joe Marks, Stuart Shieber, An Interactive Constraint-Based System for Drawing Graphs, 1997, Proceedings of the 10th Annual ACM Symposium on User Interface Software and Technology (UIST '97), pp. 97-104.*

Mark H. Walker, Nanette Eaton, Microsoft® Office Visio® 2003 Inside Out 2003, Microsoft Press, Chapter 3, pp. 58-75, ISBN-13: 978-0-7356-1516-8.*

Tim Dwyer, Kim Marriott and Michael Wybrow, Interactive, Constraint-Based Layout of Engineering Diagrams, 2008, EASST, vol. 13, pp. 1-8.*

Dobkin, et al., "Implementing a General-Purpose Edge Router", Retrieved at << http://citeseerx.ist.psu.edu/viewdoc/summary?doi=10.1.1.87.7206 >>, Proceedings of Graph Drawing, LNCS 1353, 1997, pp. 10.

Holten, et al., "Force-Directed Edge Bundling for Graph Visualization", Retrieved at << http://www.win.tue.nl/~dholten/papers/forcebundles_eurovis.pdf >>, Computer Graphics Forum, vol. 28, No. 3, Jun. 2009, pp. 8.

Dwyer, et al., "Constrained Stress Majorization Using Diagonally Scaled Gradient Projection", Retrieved at << http://citeseerx.ist.psu.edu/viewdoc/summary?doi=10.1.1.70.2851 >>, Graph Drawing, 15th International Symposium, GD, Sep. 24-26, 2007, pp. 13.

Dwyer, et al., "Constrained Graph Layout by Stress Majorization and Gradient Projection", Retrieved at << http://www.csse.monash.edu.au/~marriott/DwyKorMar09.pdf >>, Discrete Mathematics, vol. 309, No. 7, pp. 1895-1908.

Dwyer, et al., "Topology Preserving Constrained Graph Layout", Retrieved at << http://www.csse.monash.edu.au/~tdwyer/topology.pdf >>, Graph Drawing: 16th International Symposium, GD, Sep. 21-24, 2008, pp. 12.

Dwyer, et al., "Integrating Edge Routing into Force-Directed Layout", Retrieved at << http://citeseerx.ist.psu.edu/viewdoc/download?doi=10.1.1.90.4316&rep=rep1&type=pdf >>, Graph Drawing, 14th International Symposium, GD, Sep. 18-20, 2006, pp. 12.

Dokulil, et al., "Edge Routing with Fixed Node Positions", Retrieved at << http://ieeexplore.ieee.org/stamp/stamp.jsp?tp=&arnumber=4578013 >>, 12th International Conference Information Visualisation, Jul. 9-11, 2008, pp. 626-631.

Dwyer, Tim., "Scalable, Versatile and Simple Constrained Graph Layout", Retrieved at << http://www.csse.monash.edu.au/~tdwyer/Dwyer2009FastConstraints.pdf >>, In Proceedings Eurographics, IEEE-VGTC Symposium on Visualization (Eurovis), 2009, pp. 8.

Dwyer, Tim, et. al. Dunnart: A Constraint-Based Network Diagram Authoring Tool. In Proc. 16th Intl. Symp. Graph Drawing (GD'08), vol. 5417 of Lecture Notes in Computer Science, pp. 420-431. Springer, 2009.

* cited by examiner

CONTROLLING EDGE ROUTING USING LAYOUT CONSTRAINTS

BACKGROUND

A typical computer-based diagramming system facilitates the layout of various objects in a graph. The objects include nodes, which may have any of a variety of shapes, appearances, or properties. Rectangles, ovals, and bitmap images are examples of nodes that may be included in a graph. Edges are objects that connect two or more nodes. An example of an edge is a line that connects two nodes, where a line may be have multiple line segments, each one being straight or curved.

A user may use a diagramming system to create and manipulate nodes and edges. One technique is to use a pointer to manually select, move, or resize nodes or edges. An edge may have way points positioned on an edge line. Manual movement of an edge way point directs the system to redraw the edge so that it includes the new position of the way point.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, in one embodiment, a system, method, and components operate to facilitate creating or editing a graph diagram having multiple nodes and edges, each edge connecting a node with itself or one or more other nodes. Each edge has at least one way point. In one embodiment, mechanisms include receiving at least one constraint specification indicating that a way point associated with an edge is to be constrained relative to another way point associated with another edge. The constraint may be a horizontal alignment, a vertical alignment, or another alignment.

In one embodiment, mechanisms include receiving at least one constraint specification indicating a distribution of one or more way points relative to two end points in the diagram. An example distribution may specify that the way points are to be spaced apart approximately equally, either horizontally or vertically from each other and the end points. In another example distribution, a constraint may specify that a way point is to be positioned midway between two end points in the horizontal dimension.

In one embodiment, mechanisms include receiving at least one constraint specification indicating that a way point is to be spaced a minimum distance from a specified point in the diagram.

In one embodiment, mechanisms described herein may operate to automatically determine one or more constraint specifications based on a property of two edges. The property may be a target node to which each edge connects, a side or region of the target node, a pointer type, a pointer direction, or another characteristic of the edges.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
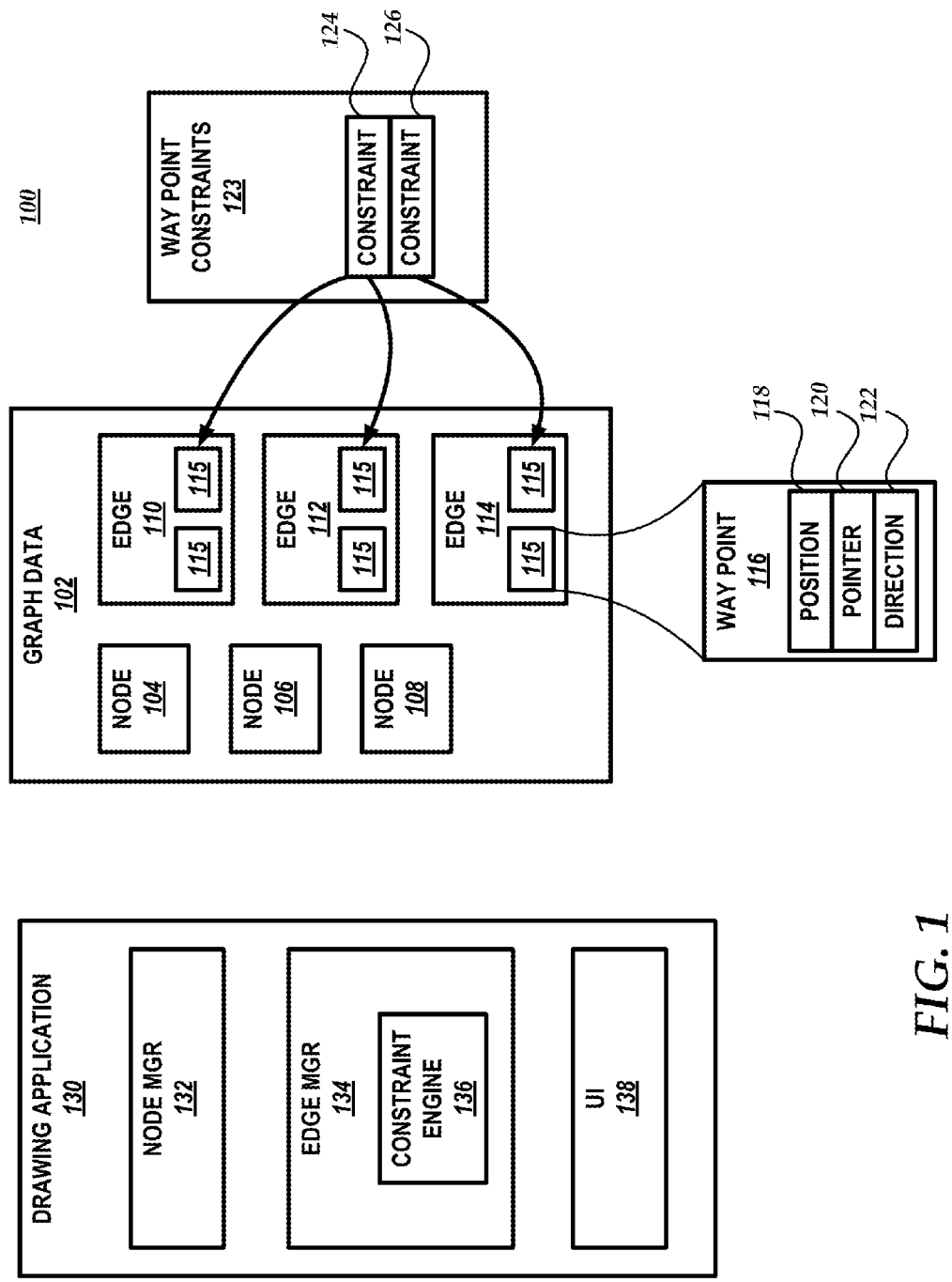
FIG. 1 is a block diagram of an example computer system in which mechanisms described herein may be deployed.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processor" refers to a physical component such as an integrated circuit that may include integrated logic to perform actions.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data. An application component may be implemented as a combination of physical circuitry and associated logic. For example, an ASIC may be used to implement an application component.

References are made herein to absolute or relative distances, alignments, or positions of points. Unless clearly stated otherwise, these references may refer to a single dimension or multiple dimensions. For example, a statement that a first point is midway between two end points may indicate that the x coordinate of the first point is midway between the x coordinates of the end points, regardless of their respective y coordinates.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

Briefly, in one embodiment, mechanisms described herein may be used to facilitate creation, editing, modifying, or rendering a diagram, and specifically, a graph diagram. As used herein, a graph diagram, or simply "graph," is a diagram that includes one or more nodes and one or more edges. Generally, the edges connect two or more nodes, though in some embodiments, an edge may connect a node to itself. In some embodiments, edges may have one or more associated way points. The positions of an edge's way points may determine the position of each segment of an edge. Some mechanisms described herein may be used to automatically determine constraints corresponding to one or more way points. Constraints may be specified by a user, automatically determined, or a combination thereof. Some mechanisms may be used to automatically determine positions of way points based on constraints, locations of nodes, edge types, edge directions, pointer types, or other factors.

Figure 2:
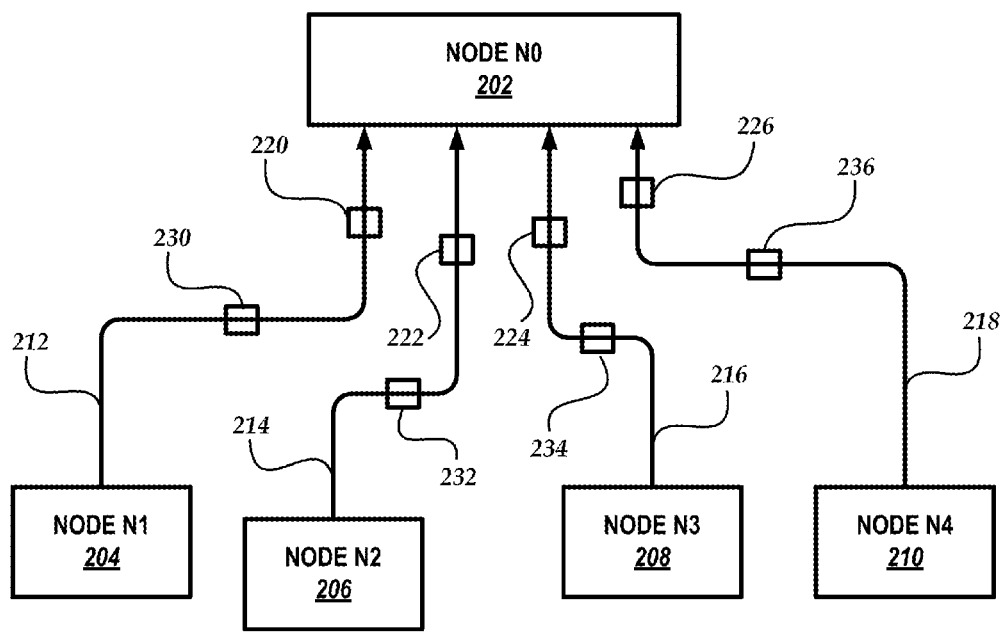
FIG. 2 is a block diagram of an example graph that may be processed by mechanisms described herein.
Figure 3:
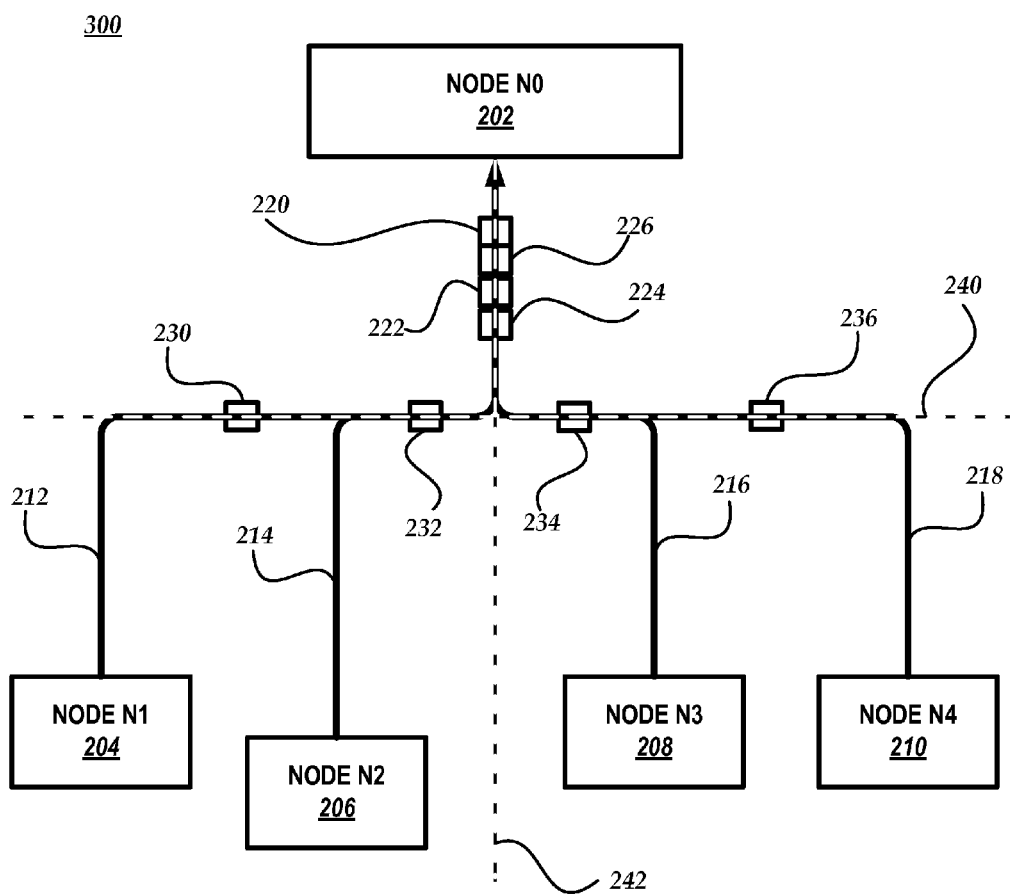
FIG. 3 is a block diagram of an example graph that may be processed by mechanisms described herein.
Figure 4:
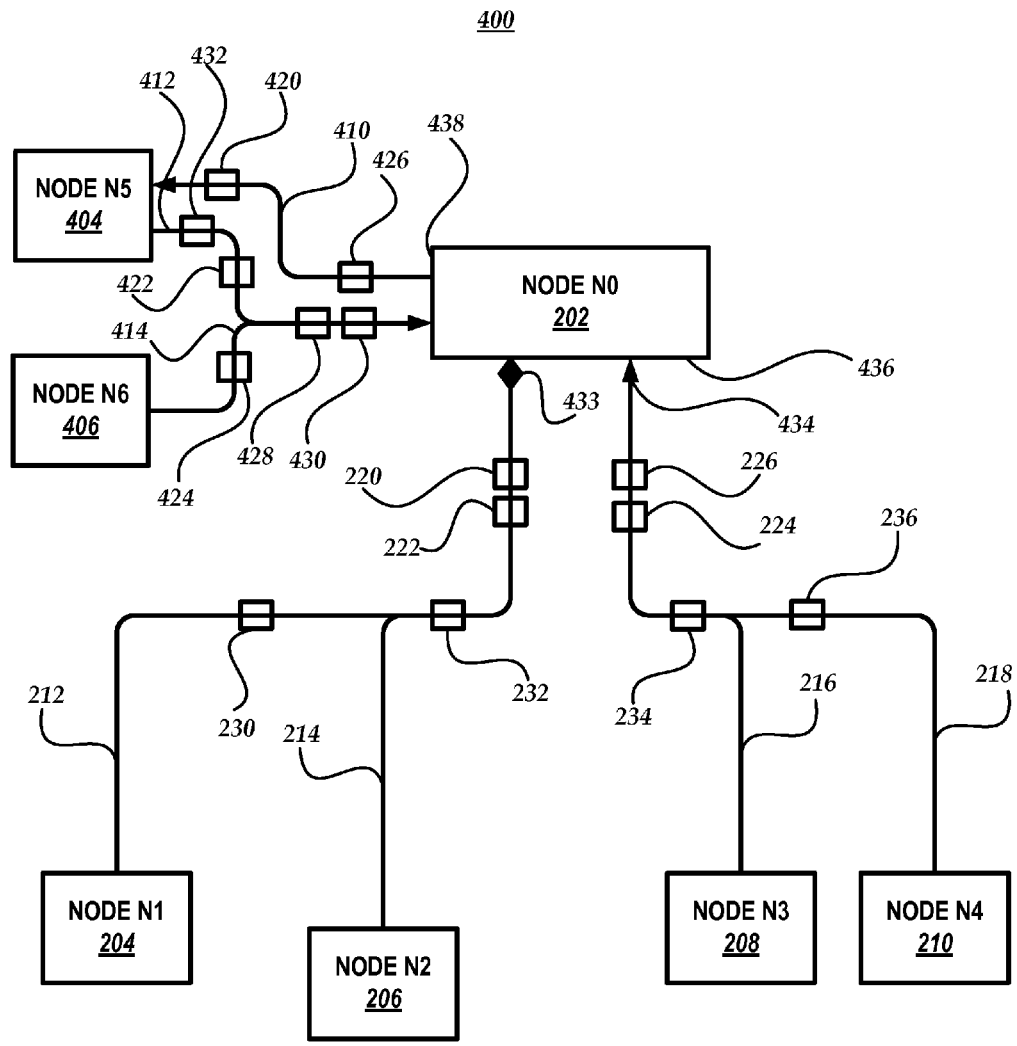
FIG. 4 is a block diagram of an example graph that may be processed by mechanisms described herein.

FIG. 1 is a block diagram of an example computer system 100 in which mechanisms described herein may be deployed. The illustrated example system 100 includes example graph data 102. Graph data 102 includes data that represents or describes objects of a graph diagram. Example graph data 102 includes two types of objects: nodes 104, 106, 108 and edges 110, 112, 114. A node is an object that may be connected to one or more other nodes, or to itself, by one or more edges. An edge is an object that connects one or more nodes to one or more other nodes, or a node to itself. An edge may be implemented as a line having one or more line segments. Each line segment in a line may have orientations different from other line segments of the same line. Thus, "line" as used herein differs from a strict mathematical definition of line. Each line segment may be straight or curved. FIGS. 2-4 illustrate examples of nodes and associated edges in a graph. Though the edges of FIGS. 2-4 each have two endpoints, a "tree" edge may have multiple branches, each of which may be considered to be an edge, combined to form a combination edge.

As illustrated in FIG. 1, an edge may have one or more way points 115. A way point is an object associated with an edge that may be used to specify or control a position of the edge or individual edge segments. An edge segment may have zero, one, or more way points. Some way points may have a position that is within its corresponding edge segment. For example, it may be positioned at the midpoint of an edge segment. Some way points may have positions that are outside of the edge segment. For example, one or more way points outside of an edge segment may be used to specify a curve of the edge segment.

FIG. 1 includes a blown-up representation of a way point, labeled as way point 116. In the illustrated implementation, each way point has one or more properties. Position property 118 may specify a position of the way point. For example, position property 118 may include an X coordinate and a Y coordinate of the way point, with a configured point as an origin. A corner of the encompassing window, a corner of the graph, or any other point may be used as an origin. Pointer property 120 may specify a type of pointer that is used with the edge. Direction property 122 may indicate a direction in which the edge points. This may correspond to the end of the edge where the pointer is, though in some embodiments a pointer may be in a location other than the end of the edge.

Example system 100 further includes a set of way point constraints 123. Two constraints are illustrated, though a system may include less or more constraints. As illustrated, each of constraints 124 and 126 specifies a constraint corresponding to one or more way points. A horizontal alignment constraint, for example, may specify that a way point is to be horizontally aligned with a corresponding way point of another edge. A vertical alignment constraint may specify that a way point is to be vertically aligned with a corresponding way point of another edge.

A distribution constraint may specify that one or more way points are to be spaced apart from one or more end points according to specified rules. One example distribution rule is an equal horizontal spacing of one or more way points between two specified end points. An end point may be another way point, a point on a node or other object, or any other specified point on the diagram. For example, a distribution constraint applying to one way point and specifying end points on two nodes may indicate that the way point is to be midway between the two node points in either the horizontal or vertical dimension, or both. In another example, a distribution constraint applying to four way points may indicate that the second and third way point are to be equally spaced between the first and fourth way point, the latter two way points serving as end points. Another example rule is a minimum vertical distance between a way point and a reference point, the reference point being another way point, a point on a node, or any point on the diagram.

Some constraints may be conditional. For example, a constraint may be designated as applying provided another constraint is not violated. Various other rules may be used in conjunction with constraints. A way point may be referenced by zero, one, or more constraints. A constraint may be specified as applying in a horizontal direction, a vertical direction, or both. As used herein, a horizontal alignment of a group of way points indicates a configuration in which the way points of the group have a common x coordinate using a normal x and y coordinate system; vertical alignment of two or more way points indicates a configuration in which the way points have a common y coordinate, though various implementations may have other orientations. In one embodiment, a graph may use a polar coordinate system, and edges may be positioned based on angles from a node or other reference point.

It is to be noted that, though FIG. 1 illustrates way point properties within each way point and constraints referencing way points, actual data structures may be implemented in a variety of ways, and data items may be physically integrated or separated from associated data or objects.

System 100 further includes drawing application 130. In the illustrated embodiment, several components of drawing application 130 are shown. Node manager 132 includes logic that controls creation, positioning, manipulation, and deletion of nodes, as well as other functions. Edge manager 134 includes logic that controls creation, positioning, manipulation, and deletion of edges, as well as other functions. This may include positioning each edge segment based on way points of the edge. In one implementation, edge manager 134 includes constraint engine 136. Constraint engine 136 may include logic that controls the creation, modification, and application of way point constraints. In one embodiment, constraint engine 136 automatically determines or modifies way point constraints, as described further herein.

Drawing application 130 may also include user interface (UI) component 138. UI component 138 may control the rendering of diagram objects, such as nodes and edges. It may also receive user input that is used to create, edit, manipulate, or delete nodes or edges.

The VISIO® Application, by Microsoft Corp., is one example of a drawing application that may be modified to employ mechanisms described herein.

FIG. 2 is a block diagram of an example graph 200 that may be processed by mechanisms described herein. Graph 200 is merely one of many graphs that may be processed, with graphs containing more or fewer nodes or edges.

Graph 200 includes node N0 202, node N1 204, node N2 206, node N3 208, and node N4 210. Each of nodes N1 204, N2 206, N3 208, and N4 210 are connected to node N0 202 by edges 212, 214, 216, and 218, respectively. Edge 212 has associated way points 220 and 230; edge 214 has associated way points 222 and 232; edge 216 has associated way points 224 and 234; edge 218 has associated way points 226 and 236. Though rectangles are used to represent way points herein, any of a variety of visual representations may be used.

In one embodiment, each of way points 230, 232, 234, and 236 may be used to control vertical movement of their corresponding edge segment, and way points 220, 222, 224, and 226 may be used to control horizontal movement of their corresponding edge segment.

FIG. 2 illustrates example graph 200 prior to application of edge constraints. FIG. 3 is a block diagram of an example graph 300 that may be processed by mechanisms described herein. More specifically, example graph 300 illustrates an example transformation of graph 200 by application of edge constraints. Two example constraints have been applied to graph 200 to produce graph 300. One constraint specifies that the group of way points 230, 232, 234, and 236 are to be vertically aligned. Constraint line 240, shown as a dashed line partially overlaying edge segments, represents this constraint. A second constraint specifies that the group of way points 220, 222, 224, and 226 are to be horizontally aligned. Constraint line 242, shown as a dashed line, represents this constraint. As illustrated, each of these constraints has been applied. The line segments corresponding to each way point are positioned based on the way point position; in this embodiment, the line segments pass though the associated way point. The application of the constraints in this example causes line segments to at least partially overlap. This is an example of edge bundling, in which some edge segments are bundled together, reducing visual clutter.

As illustrated, in one embodiment, way points may be positioned so that each way point is visible, although their default position may cause one or more to be hidden behind another way point. In one embodiment, way points may be at least partially hidden based on the ordering of their respective edges. In one embodiment, constraint lines 240 or 242, or other visual representations of constraints, may be displayed to a user. The system may enable the user to modify constraints by selecting and manipulating a constraint representation. For example, a constraint may be deleted or moved by user manipulation of a constraint line representation.

Though the example graph 300 illustrates a group of edges with way points having both horizontal and vertical constraints, various configurations may differ. For example, a subset of the edges 212, 214, 216, and 218 may have a horizontal constraint, and a different subset may have a vertical constraint. FIG. 4 illustrates an example graph 400 in which way points 230, 232, 234, and 236, corresponding to respective edges 212, 214, 216, and 218, have a common vertical constraint; way points 220 and 222, corresponding to edges 212 and 214 are in a group having a common horizontal constraint; and way points 224 and 226, corresponding to edges 216 and 218, are in another group having a common horizontal constraint.

It is to be noted that in this example graph, nodes N1 204, N2 206, N3 208, and N4 210 are not vertically aligned, though in other examples they may be. These nodes are also not all equally distributed horizontally, though in other examples they may be. In one embodiment, positioning of one or more of these nodes may cause constraint engine 136 to reposition the way points of associated edges or way points of other edges. For example, one type of constraint may specify that the way points 230, 232, 234, and 236 are to be vertically aligned midway between node N0 202 and the node of nodes N1 204, N2 206, N3 208, and N4 210 that is vertically closest to node N0 202. With this constraint, moving a single node may cause the way points corresponding to edges of other nodes to be repositioned.

The movement of nodes that may trigger constraint engine 136 to reposition one or more way points may be the result of a user manually moving one or more nodes, application of constraints on one or more of the nodes, or a programmatic repositioning of one or more nodes in response to program logic associated with the drawing application or graph. For example, the position of some nodes may be based on some data, and node manager 132 may reposition one or more nodes in response to a change in the data.

FIG. 4 is a block diagram of an example graph 400 that may be processed by mechanisms described herein. As described in FIG. 2, example graph 400 includes node N0 202, node N1 204, node N2 206, node N3 208, and node N4 210. It further includes edges 212, 214, 216, and 218, and way points 220-236.

In FIG. 4, edges 212 and 214 are a first type of edge, as indicated by a diamond-shaped pointer 433, and referred to herein as the diamond group. Edges 216 and 218 are a second type of edge, as indicated by an arrow-shaped pointer 434, and referred to herein as the arrow group. As illustrated, way points 220 and 222 of the diamond edge group are horizontally aligned with each other; way points 224 and 226 of the arrow edge group are horizontally aligned with each other.

In one embodiment, a user may configure way points 230, 232, 234, and 236 to be vertically aligned, way points 220 and 222 to be horizontally aligned with each other, and way points 224 and 226 to be horizontally aligned with each other. FIG. 4 further illustrates a technique in which constraint engine 136 may automatically determine one or more constraints based on edge types, edge direction, target node sides, or other factors.

In one embodiment, constraint engine 136 may determine that way points 230, 232, 234, and 236 are each way points of horizontal edge segments on edges that connect bottom side 436 of node N0 202 with another node. Constraint engine 136 may be configured with constraint rules specifying that way points sharing these characteristics are to be grouped together and vertically aligned with each other. It may therefore automatically determine a group of way points and a constraint. The processes described herein may then be applied to position these way points based on the determined constraint.

In one embodiment, constraint engine 136 may determine that way points 220 and 222 are each way points of vertical edge segments on edges that connect bottom side 436 of node N0 202 with another node, and these edges are of a common type; specifically that they both have a diamond pointer 433 and point in the same direction, toward node N0 202. Constraint engine 136 may be configured with constraint rules specifying that way points sharing these characteristics are to be grouped together and horizontally aligned with each other. Similarly, way points 224 and 226 are associated with vertical edge segments that connect bottom side 436 of node N0 202 with another node, and these edges are of a common type; specifically that they both have an arrow pointer 434 and point in the same direction. In this example, constraint rules specify that edges are to be placed in groups having common types, that the corresponding vertical way points of each group are to be spaced apart in a configured manner, based on the number of such groups, the amount of space available, or other factors. The processes described herein may then be applied to position these way points based on the determined constraint.

Graph 400 further includes node N5 404, connected to node N0's left side 438 by edges 410 and 412, and node N6 406, connected to node N0's left side 438 by edge 414. Edges 412 and 413 both have the characteristics of an arrow pointer that points toward the target node N0 202. Edge 410 has an arrow pointer that points away from the target node N0. Therefore, edge 410 may be considered to be a different type than edges 412 and 414. Additionally, edges 410, 412, and 414 differ from edges 212-218 due to edges 410, 412, and 414 terminating at the left side 438 of node N0 202, while edges 212-218 terminate at the bottom side 436 of node N0 202.

Based on these groupings and a configured constraint rule, way points 428 and 430 may be grouped together and automatically provided a constraint that they are to be vertically aligned; way point 426 may be in a different group of one. Constraint engine 136 may automatically generate a distribution constraint specifying that the two way point groups are to be vertically spaced apart with respect to end points of the top left corner of node N0 202 and the bottom left corner of node N0 202, with equal spacing between the way point groups and the end points. Thus the vertical coordinates of the top left node N0 corner, way point 426, way point 430, and the bottom left node N0 corner would have equal spacing between them, causing their respective edges to connect to left side 438 of node N0 202 at different points. Similarly, constraint engine 136 may automatically determine a constraint specifying that horizontal way point 420 of edge 410 is to be vertically spaced apart from horizontal way point 432 of edge 412 causing the respective edge ends to terminate at different locations at node N5 404.

As illustrated, way points 422 and 424 are associated with vertical segments of edges having common characteristics of target node and side, and edge type. They may therefore be automatically grouped together and configured to have a constraint that aligns them horizontally. Way points 428 and 430 are also associated with horizontal segments of edges 412 and 414, having common characteristics of target node and side, and edge type. They may therefore be automatically grouped together and configured to have a constraint that aligns them vertically. The processes described herein may then be applied to position these way points based on the determined constraints.

In one embodiment, a system may cause constraint engine 136 to determine constraints such as discussed herein, and position way points based on the constraints. The edges may be rendered and displayed to a user. The system may enable a user to manually modify the constraints. A modification may, for example, cause a specified way point to be excluded from a group for which a constraint was automatically generated. Another modification may remove or modify a specified constraint that was automatically generated.

In the example graph 400, the characteristics of edge pointer and pointer direction are used to determine and distinguish edge types and groups of common edge types. In various configurations, one or more other characteristics may be used instead of, or in addition to, these characteristics to determine edge types. For example, one or more of line color, line pattern, line labels or other characteristics may be used to determine edge types. Some edge characteristics may not have a visible manifestation.

Figure 5:
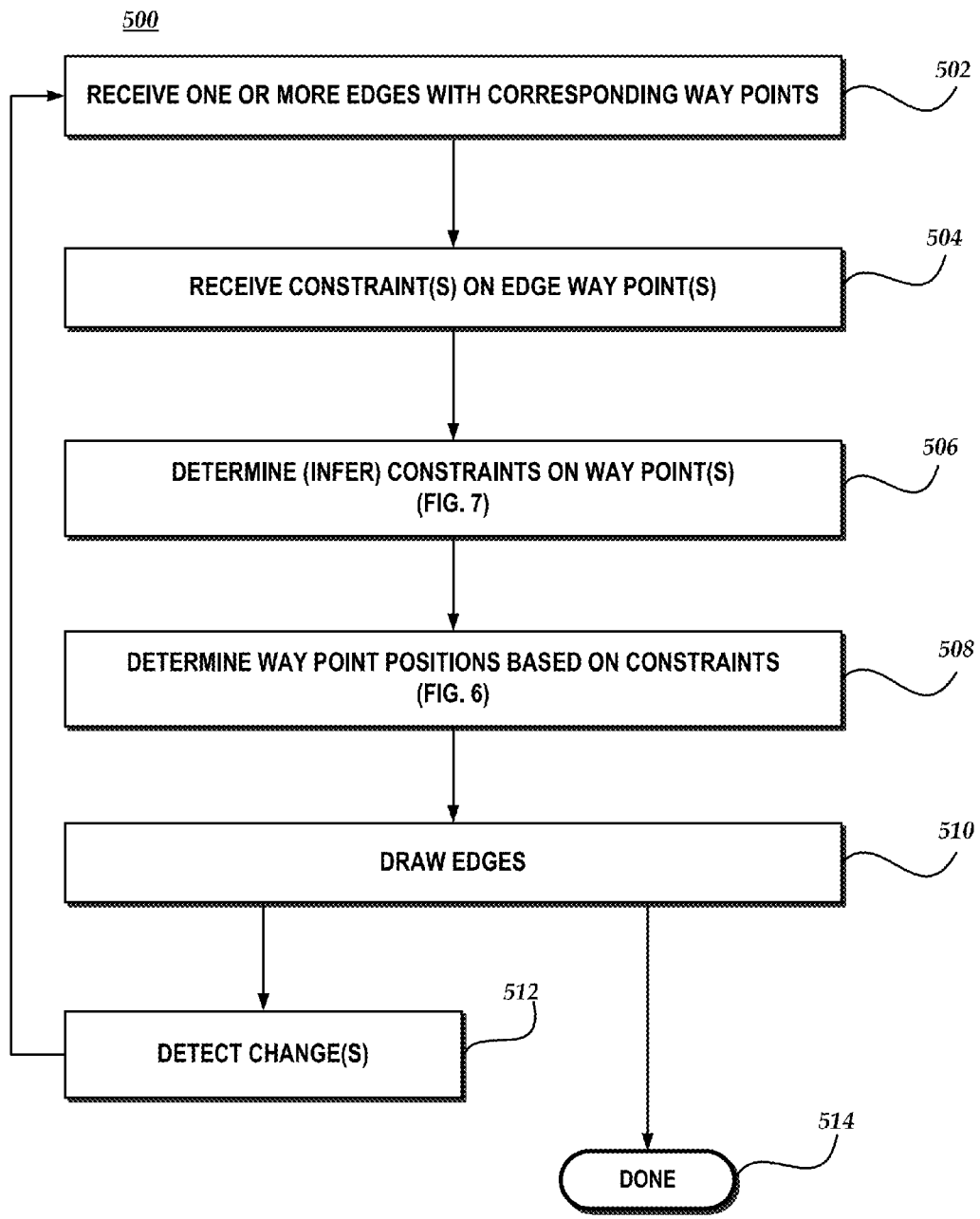
FIG. 5 is a flow diagram illustrating an example embodiment of a process for automatically controlling edge routing.

FIG. 5 is a flow diagram illustrating an example embodiment of a process 500 for employing constraints to position edges in a graph diagram. Process 500, or a portion thereof, may be performed by various embodiments of system 100 or a variation thereof. Components of system 100 are used as examples of an implementation herein, though in various embodiments, the correspondence of process actions and components may vary. The illustrated portions of process 500 may be initiated at block 502, where one or more edges are received, each edge having a corresponding way point. Each edge may have configuration data identifying one or more nodes that it connects to. In some embodiments, a connection of a node and an edge may indicate that the edge and node share a common point. However, in some embodiments, this may vary. For example, a node and an edge may be considered to be connected though they are spaced a specified distance apart. In one embodiment, edge manager 134 may receive one or more edges from graph data 102.

The process may flow to block 504, where one or more way point constraints are received These may be constraints that have been configured by a user, provided by some data such as in a file or message, or constraints that have been determined by a previous performance of process 500 or a portion thereof.

Figure 7:
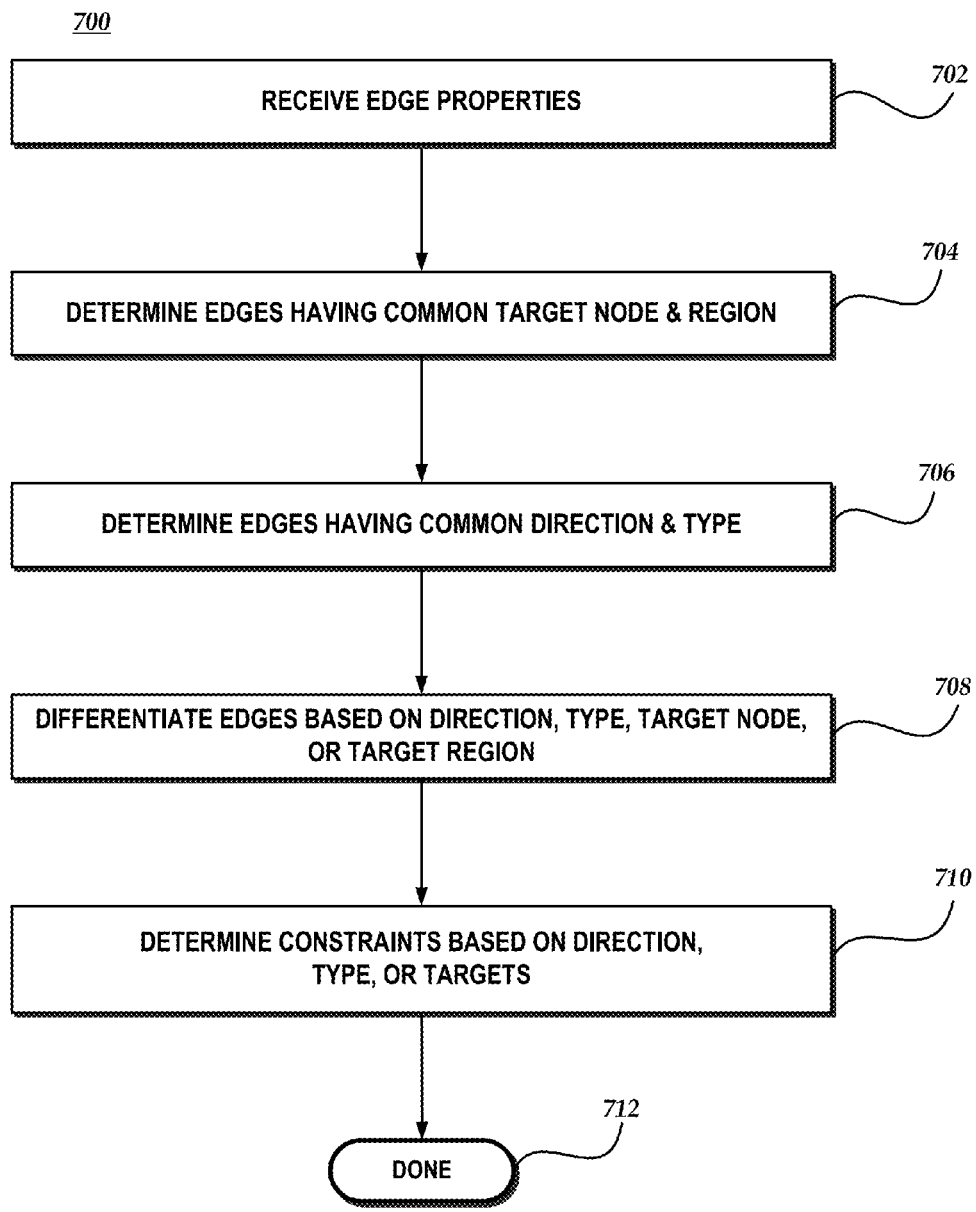
FIG. 7 is a flow diagram illustrating an example embodiment of a process for automatically determining constraints of one or more way points.

The process may flow to block 506, where one or more constraints may be automatically determined for one or more way points. FIG. 7 illustrates a process that may implement at least some actions of block 506.

Figure 6:
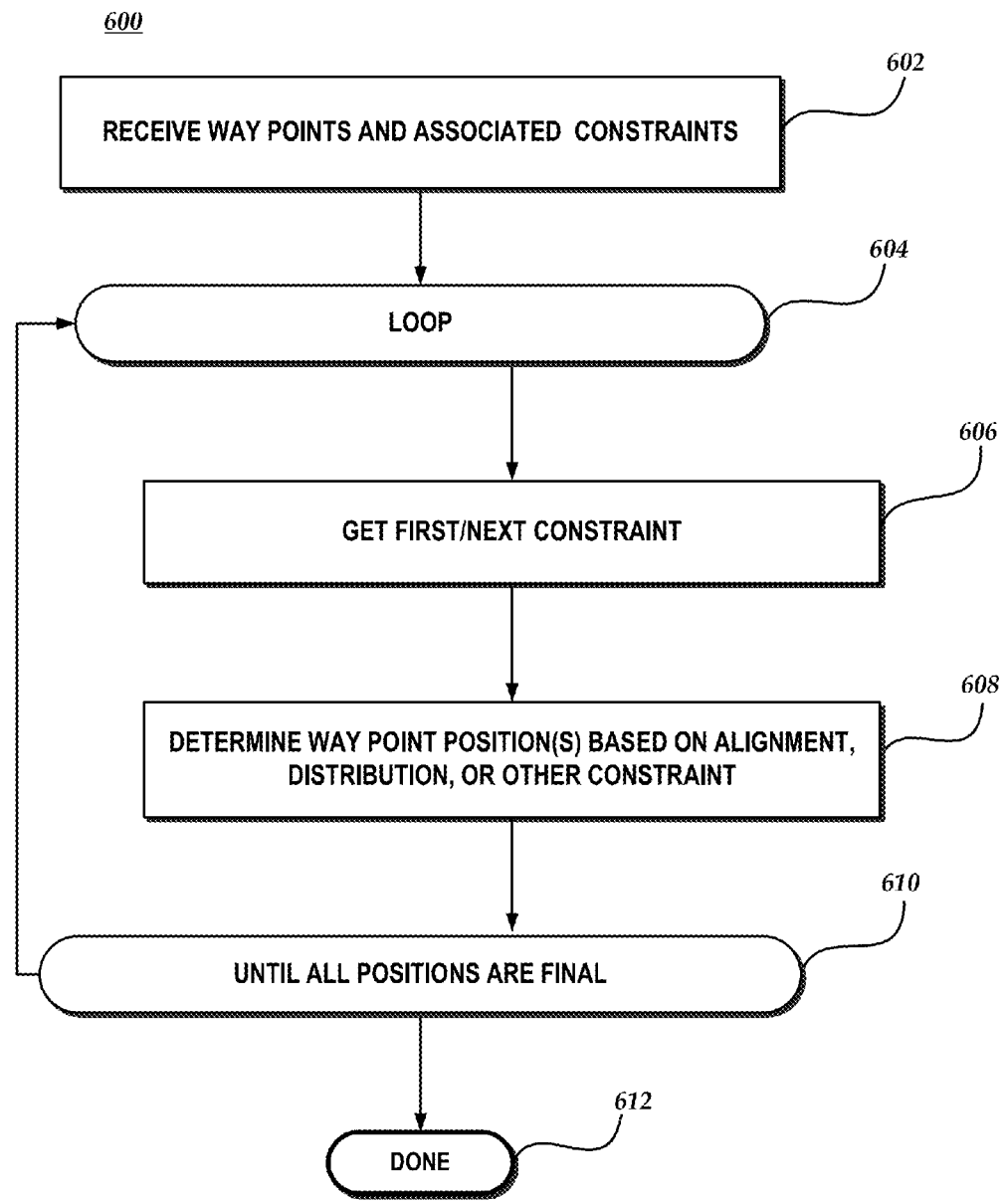
FIG. 6 is a flow diagram illustrating an example embodiment of a process for automatically determining positions of one or more way points.

The process may flow to block 508, where positions of one or more way points may be determined based on the constraints resulting from block 504 or 506. FIG. 6 illustrates a process that may implement at least some actions of block 508.

The process may flow to block 510, where UI component 138 may draw the edges associated with the processed way points, as well as other edges. This action may include determining the positions and visual appearance of edge segments associated with each way point.

The process may flow to block 512, where changes are detected. Changes may include changes to constraint specifications, movement, deletion, or addition of nodes, edges, or other diagram objects, changes to edge properties, or other changes to the diagram. The UI may perform actions including receiving input commands specifying any of these changes. It may provide a command to modify a constraint specification to the constraint engine. In response to receiving such changes, the process may flow back to block 502, where one or more of the actions of blocks 502-510 may be performed. In some implementations, the loop beginning at block 502 may repeat until there are no changes detected. The process may then flow from block 510 to done block 514, and exit or return to a calling program. During any iteration of the loop beginning at block 502, one or more of the actions may be omitted or reordered.

FIG. 6 illustrates a process 600 for determining edge way point positions based on constraints. Process 600, or a portion thereof, may be used to implement at least some of the actions of block 508 of FIG. 5. In one implementation, portions of process 600 may be performed by constraint engine 136 of FIG. 1.

The illustrated portions of process 600 may begin at block 602, where one or more way points and associated constraints are received. Constraints may have been created by a user, automatically determined, or a combination thereof.

The process may flow to loop 604, which iterates for each constraint. In the illustrated embodiment, loop 604 includes blocks 606-610, and is terminated by block 612. Actions of loop 604 may flow to block 606, where the first constraint is retrieved during the first loop iteration, or the next constraint is retrieved during subsequent iterations. Each constraint has one or more associated way points.

The process may flow to block 608, where the positions of way points associated with the current constraint are determined. Depending on the type of constraint, this may include aligning two or more way points, distributing one or more way points, or positioning one or more way points based on another type of constraint. A distribution constraint may specify that a group of way points are to be distributed between two end points by some configured rules. For example, the way points may be equally distributed between two end points, constrained to a minimum distance from each other or to a node, midway between nodes associated with the edge, or in another way. For any way point, distribution may affect its horizontal position, vertical position, or both.

The process may flow to block 610, which terminates loop 604. The process may flow back to loop 604 and perform another iteration of the loop, or flow to done block 612, based on whether there are more constraints to process. In some embodiments, loop 604 may be iterated more than once for a constraint, in order to account for processing of another constraint. The initial determined way point positions may be temporary. When it is determined that all way points are in their final positions, loop 604 may exit.

At done block 612, the process may exit or return to a calling program.

FIG. 7 illustrates a process 700 for automatically determining constraints for edge way points. Process 700, or a portion thereof, may be used to implement at least some of the actions of block 506 of FIG. 5. In one implementation, portions of process 700 may be performed by constraint engine 136 of FIG. 1.

The illustrated portions of process 700 may be initiated at block 702, where edge properties may be received. Examples of edge properties include pointer type, direction, nodes, sides of nodes, or regions of nodes to which the edge connects, color, line type, data associated with the edge, or other edge characteristics.

The process may flow to block 704, where a determination is made of edges having a common target node and region. A region may be a side of the target node, a portion of a node side, or an area of the target node. For an edge associated with two or more nodes, any one or more of the nodes may be considered to be a target node. In one implementation, any associated node having more than one associated edge is considered to be a target node.

The process may flow to block 706, where a determination is made of edges having a common direction, type, or other property, or any configured combination of properties. The process may flow to block 708, where edges are differentiated and grouped based on direction, type, or any one or more properties. FIG. 4 illustrates an example where edges are grouped based on a combination of direction and pointer type.

The process may flow to block 710, where constraints are automatically determined based on one or more of edge direction, type, nodes, sides of nodes, or regions of nodes to which the edge connects, color, line type, data associated with the edge, or other edge characteristics. A constraint may be determined based on an orientation of an edge segment corresponding to the way points. For example, way points having corresponding vertical edge segments may be horizontally aligned or distributed; way points having corresponding horizontal edge segments may be vertically aligned or distributed.

The process may flow to done block 712, and exit or return to a calling program. As described, process 700 enables constraint engine 136 to infer constraints of edge way points, and may be performed without a user manually specifying the constraints.

Figure 8:
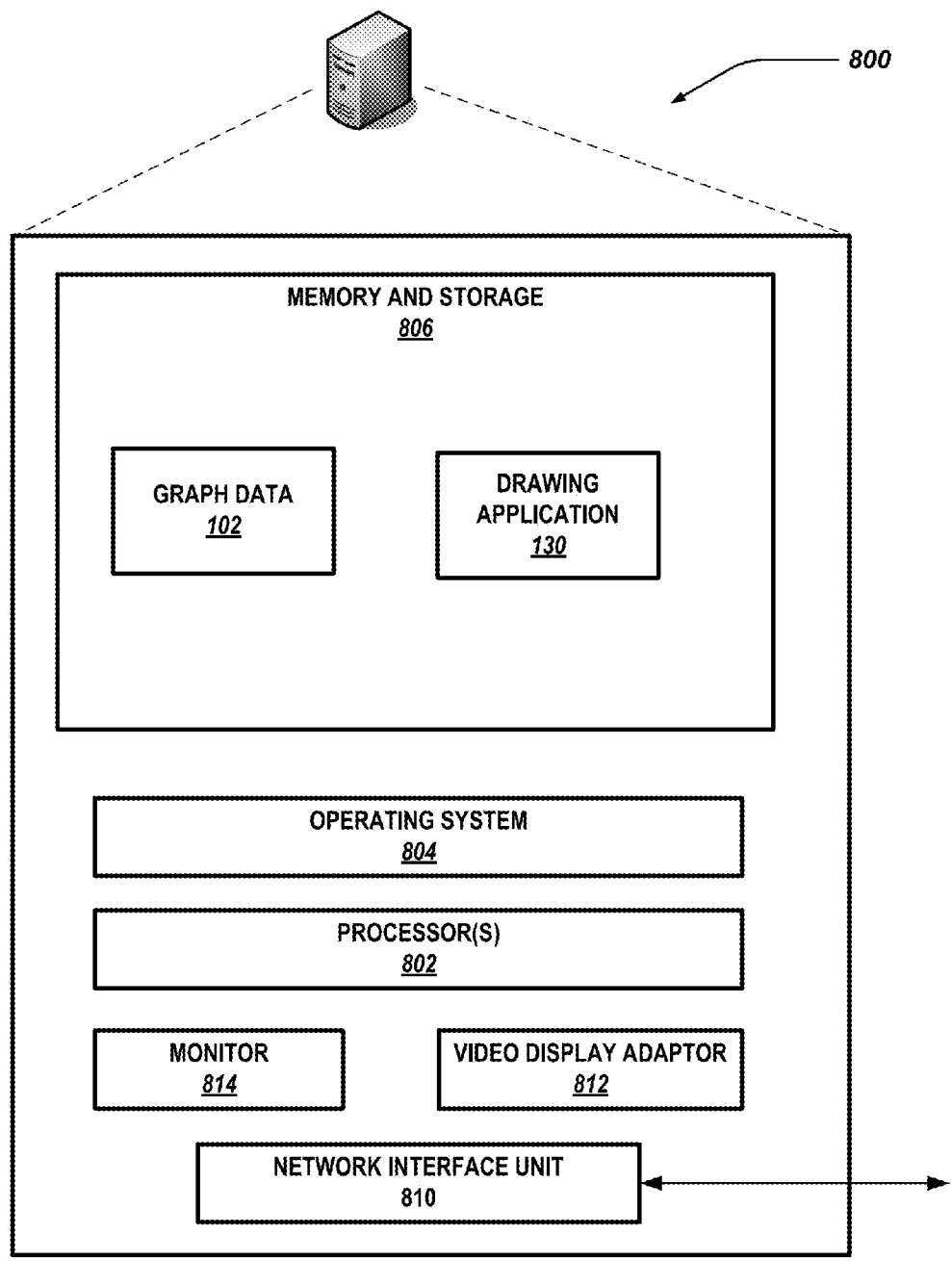
FIG. 8 is a block diagram showing one embodiment of a computing device, illustrating selected components of a computing device that may be used to perform functions described herein.

FIG. 8 is a block diagram showing one embodiment of a computing device 800, illustrating selected components of a computing device that may be used to implement mechanisms described herein, including system 100 and processes 500, 600, or 700. Computing device 800 may include many more components than those shown, or may include less than all of those illustrated. Computing device 800 may be a standalone computing device or part of an integrated system, such as a blade in a chassis with one or more blades. Though the components of computing device 800 are illustrated as discrete components, any one or more of them may be combined or integrated into an integrated circuit, such as an ASIC.

As illustrated, computing device 800 includes one or more processors 802, which perform actions to execute instructions of various computer programs. In one configuration, each processor 802 may include one or more central processing units, one or more processor cores, one or more ASICs, cache memory, or other hardware processing components and related program logic. As illustrated, computing device 800 includes an operating system 804. Operating system 804 may be a general purpose or special purpose operating system. The WINDOWS® family of operating systems, by Microsoft Corporation, of Redmond, Wash., includes examples of operating systems that may execute on computing device 800.

Memory and storage 806 may include one or more of a variety of types of non-transitory computer storage media, including volatile or non-volatile memory, RAM, ROM, solid-state memory, disk drives, optical storage, or any other medium that can be used to store digital information.

Memory and storage 806 may store one or more components described herein or other components. In one embodiment, memory and storage 806 stores graph data 102 and drawing application 130 of FIG. 2. In various configurations, multiple components implementing the functions of drawing application 130 or containing portions of graph data 102 may be distributed among multiple computing devices. In one configuration, for example, one or more components performing functions of drawing application 130 may be physically located on computing devices that are geographically separated from graph data 102 or from a user. Communication among various distributed components may be performed over a variety of wired or wireless communications mechanisms.

Any one or more of the components illustrated as stored in memory and storage 806 may be moved to different locations in RAM, non-volatile memory, or between RAM and non-volatile memory by operating system 804 or other components. In some configurations, these components may be distributed among one or more computing devices.

Computing device 800 may include a video display adapter 812 that facilitates display of graph diagrams or other information to a user. Though not illustrated in FIG. 8, computing device 800 may include a basic input/output system (BIOS), and associated components. Computing device 800 may also include a network interface unit 810 for communicating with a network. Software components, such as those stored in memory and storage 806, may be received via transitory media and network interface unit 810. Computing device 800 may include one or more display monitors 814. Embodiments of computing device 800 may include one or more input devices 816, such as a keyboard, pointing device, touch screen, keypad, audio component, microphone, voice recognition component, or other input/output mechanisms.

It will be understood that each block of the flowchart illustration of FIGS. 5-7, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based method of routing edges in a diagram having a plurality of nodes and a plurality of edges, each edge having at least one associated way point, the method implemented at least in part by at least one processor and comprising:
    a) automatically determining a constraint type indicating that a set of one or more way points is to be constrained, each way point of the set of one or more way points associated with a corresponding edge, the constraint type indicating at least one of an alignment of the set of way points and another way point associated with another edge or a distribution of the set of way points relative to two end points on the diagram;
    b) determining a position of each way point of the set of way points based on the constraint type;
    c) determining a routing of each edge corresponding to each way point of the set of way points based on the position of the corresponding way point and a routing of the other edge based on a position of the other way point; and
    d) drawing each edge corresponding to each way point of the set of way points and the other edge based on the determined routing;
    wherein automatically determining the constraint type comprises automatically determining the constraint type based on at least one of a side of a target node to which each edge corresponding to each way point of the set of way points and the other edge connect, a region of the target node, a pointer type, or a pointer direction.

2. The computer-based method of claim 1, further comprising automatically selectively specifying an alignment constraint on the set of way points and the other way point based on a property of each edge corresponding to each way point of the set of way points and a property of the other edge.

3. The computer-based method of claim 1, further comprising in response to a manual movement of a node connected to each edge corresponding to each way point of the set of way points, determining another position of each way point of the set of way points based on a constraint specification and determining another routing of each edge corresponding to each way point of the set of way points based on the corresponding way point of the set of way points.

4. The computer-based method of claim 1, further comprising automatically determining a constraint based on the pointer type.

5. The computer-based method of claim 1, further comprising automatically determining a constraint based on the pointer direction.

6. The computer-based method of claim 1, further comprising automatically determining a constraint based on at least one of a color, a line type, or data associated with each edge corresponding to each way point of the set of way points.

7. The computer-based method of claim 1, further comprising grouping edges based on a pointer type or a pointer direction associated with each edge.

8. The computer-based method of claim 1, further comprising displaying a visual representation of a constraint of each determined constraint type and enabling a user to manipulate each constraint by selecting the corresponding visual representation.

9. A computer-readable storage memory comprising computer program instructions for routing edges in a diagram having a plurality of nodes and a plurality of edges, each edge having at least one associated way point, the program instructions executable by one or more processors to perform actions including:
   a) determining a group of way points based on a property of each edge corresponding to each way point;
   b) automatically determining a constraint type to apply to the group of way points based on at least one of a side of a target node to which each edge corresponding to each way point of the group of way points and another edge connect, a region of the target node, a pointer type, or a pointer direction;
   c) for each way point of the group of way points, determining a respective position based on the determined constraint type; and
   d) determining a routing of each edge corresponding to each way point of the group of way points.

10. The computer-readable storage memory of claim 9, wherein a constraint specification of the determined constraint type specifies a distribution of a first way point of the group between two end points.

11. The computer-readable storage memory of claim 9, determining the constraint type comprises determining an alignment constraint type based on whether an edge segment corresponding to each way point of the group of way points is a horizontal edge segment or a vertical edge segment.

12. The computer-readable storage memory of claim 9, determining the constraint type comprises determining one of an alignment constraint type or a distribution constraint type based on an orientation of an edge segment corresponding to the group of way points.

13. The computer-readable storage memory of claim 9, further comprising enabling a user to manipulate a constraint of the determined constraint type and, in response to the user manipulation of the constraint, determining another routing of each edge.

14. The computer-readable storage memory of claim 9, determining the group of way points comprises selectively including a first way point in the group of way points based on a pointer type or a direction of an edge corresponding to the first way point.

15. The computer-readable storage memory of claim 9, each edge having a common first node as a starting point and a common second node as an ending point, wherein the property of each edge is at least one of pointer type, direction, color, line type, or data associated with the edge.

16. A computer-based system for editing a diagram having a plurality of nodes and a plurality of edges including a first edge having a corresponding first way point and a second edge having a corresponding second way point, comprising:
   a) a processor;
   b) a constraint engine that automatically determines one or more constraint types based on at least one of a side of a target node to which the first edge and second edge connect, a region of the target node, a pointer type, or a pointer direction, each constraint of the one or more constraint types indicating at least one of an alignment of the first way point and the second way point or a distribution of at least the first way point between a first end point and a second end point, the constraint engine configured to determine a position of the first way point based on the each constraint; and
   c) an edge manager that determines a routing of the first edge based on the position of the first way point and a routing of the second edge based on a position of the second way point.

17. The computer-based system of claim 16, further comprising a UI component that draws each of the first edge and second edge, receives a constraint specification from a user, and provides the received constraint specification to the constraint engine.

18. The computer-based system of claim 16, further comprising a UI component that displays a constraint of the one or more determined constraint types, receives a command to modify a displayed constraint, and provides the command to modify the displayed constraint to the constraint engine.

19. The computer-based system of claim 16, wherein each of the one or more constraint types is a horizontal alignment constraint type, a vertical alignment constraint type, a horizontal distribution constraint type, or a vertical distribution constraint type and a constraint is determined based on a pointer type or a pointer direction of a corresponding edge.

20. The computer-based system of claim 16, further comprising selectively determining an alignment of the first way point and the second way point based on whether the first edge and the second edge connect to a common region of the target node.

* * * * *